United States Patent [19]

Hemmi et al.

[11] 4,345,890

[45] Aug. 24, 1982

[54] INJECTION MOLDING MACHINE HAVING MOLD LOCKING UNIT EQUIPPED WITH TOGGLE DRIVE AND HYDRAULIC LOCKING MECHANISM

[75] Inventors: Peter Hemmi, Männedorf; Richard Schrepfer, Näfels, both of Switzerland

[73] Assignee: Netstal-Maschinen AG, Switzerland

[21] Appl. No.: 157,277

[22] Filed: Jun. 6, 1980

[30] Foreign Application Priority Data

Jun. 11, 1979 [CH] Switzerland ............... 5467/79

[51] Int. Cl.³ .................................................. B29F 1/06
[52] U.S. Cl. ............................ 425/143; 264/40.5; 100/214; 425/149; 425/150; 425/171; 425/172; 425/451.2; 425/590; 425/DIG. 223
[58] Field of Search .............. 264/40.5; 100/214; 425/143, 149, 150, 171, 172, 451.2, 590, DIG. 223

[56] References Cited

U.S. PATENT DOCUMENTS 1,149,518  8/1915  Holmes .......................... 100/214
3,579,741  5/1971  Schwartz ........................ 425/149

*Primary Examiner*—Thomas P. Pavelko
*Attorney, Agent, or Firm*—McGlew and Tuttle

[57] ABSTRACT

An injection mold with locking device comprises a fixed backing plate and a fixed mold part plate which are connected to each other by four tie rods. A movable mold part plate is connected to the fixed backing plate through a drive and locking mechanism which is capable of moving the movable mold part plate into a mold position with the fixed mold part plate. A thermal force control apparatus is associated with one or more of the tie rods for changing the temperature of the tie rods and thereby causing the tie rods either to expand or contract. By such expansion or contraction, the exact force applied between the fixed and movable mold part plates can be adjusted to a desired level.

7 Claims, 1 Drawing Figure

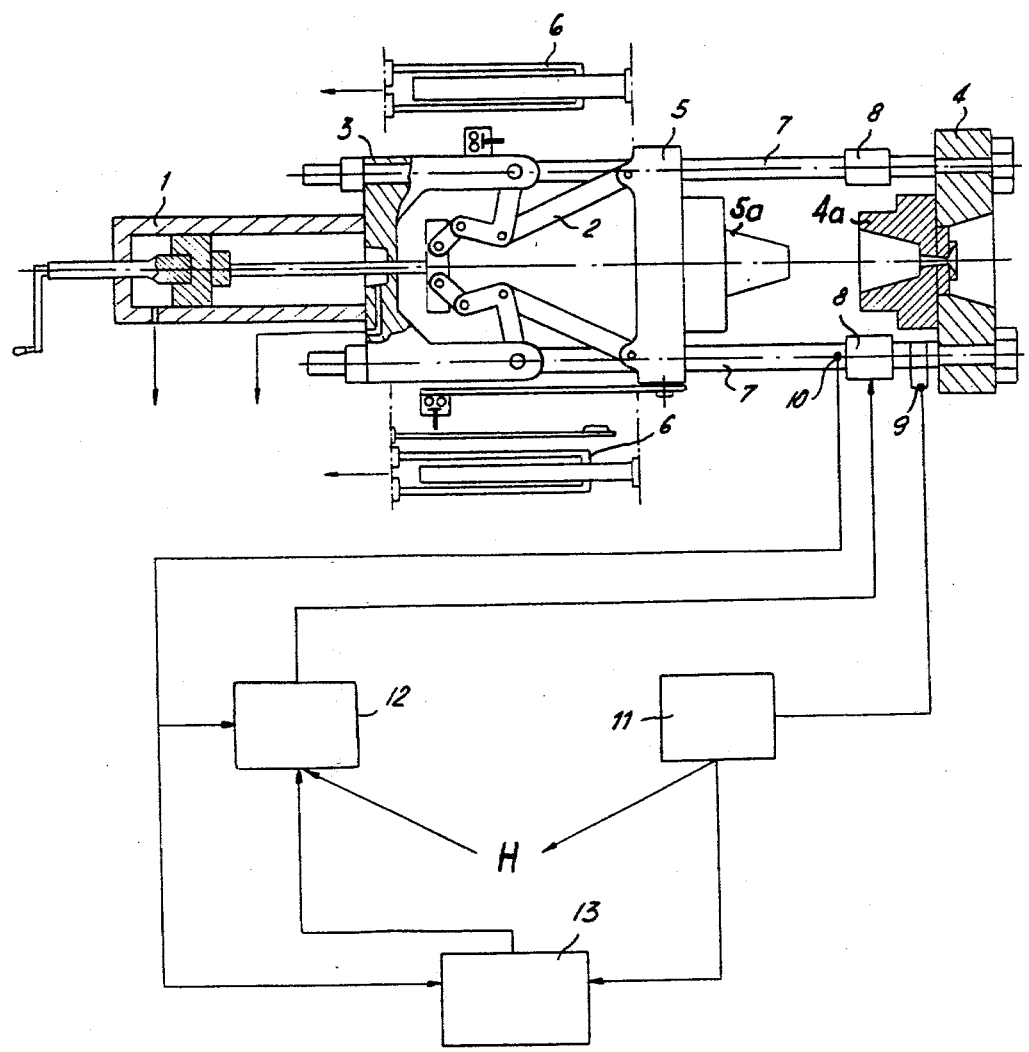

INJECTION MOLDING MACHINE HAVING MOLD LOCKING UNIT EQUIPPED WITH TOGGLE DRIVE AND HYDRAULIC LOCKING MECHANISM

FIELD AND BACKGROUND OF THE INVENTION

The present invention relates, in general, to injection molding machines and, in particular, to a new and useful mold locking arrangement having a thermal force control feature.

In injection molding machines, for example, for light metals or plastics, special, mostly complicated constructual provisions are necessary to keep the magnitude and direction of the forces exerted through a tie rod supporting the mold parts constant, for example, or to control them in a desired way. For example, in injection molding machines for plastics equipped with a toggle mold-locking mechanism in which the locking force must be taken up by a plurality of tie rods, these rods are submitted to strain or bending by which the locking force acting on the mold parts is varied. In addition, unequal variations in length, or bending, of the different tied rods may cause an unsymmetrical distribution of the locking force over the parting surfaces of the mold. There are mechanically or hydraulically operated centralized adjusting devices known by means of which the locking force of such machines can be adjusted, or controlled, automatically. Such devices are relatively inaccurate in operation and make no allowance for inevitable wear. Also, the prior art constructions for controlling the locking force are particularly expensive.

SUMMARY OF THE INVENTION

The present invention is based on a concept of eliminating these drawbacks by controlling the force thermally, not mechanically, or hydraulically.

An object of the present invention is to provide an injection mold with locking device comprising, a fixed backing plate, a fixed mold part plate, one or preferably more thermally expandible and contractable tie rods connecting the fixed mold part plate and the fixed backing plate, a movable mold part plate, drive and locking means connected between the fixed backing plate and the movable mold part plate for moving the movable mold part plate into a molding position with the fixed mold part plate and locking the movable mold part plate at this position, and thermal force control means associated with the one or more tie rods for controlling the temperature thereof and thereby altering the force between the fixed and movable mold part plates.

Since the length and, thereby, the force exerted by the tie rods is variable by varying the temperature of the rods, which may be obtained in a simple and accurate way by heating or cooling, no mechanical adjusting means are necessary. The force control through temperature variations can be effected with simple means. The construction is inexpensive and existing installed machines can be equipped with such a thermal control in a simple manner.

Another object of the invention is to provide a method of thermally controlling the force exerted by the movable mold part plate on the fixed mold part plate in a molding position.

A still further object of the invention is to provide an injection mold with locking device which is simple in design, rugged in construction and economical to manufacture.

In the following, the invention is explained, by way of example, while considering a mold locking mechanism of an injection molding machine for plastics in which the force exerted through the tie rods is thermally controlled.

For an understanding of the principles of the invention, reference is made to the following description of typical embodiments thereof as illustrated in the accompanying drawings.

BRIEF DESCRIPTION OF THE DRAWINGS

The drawings consist of a single FIGURE which diagrammatically and schematically show the workings of the invention.

DESCRIPTION OF THE PREFERRED EMBODIMENTS

Referring to the drawing, in particular, the invention includes a mold locking device comprising, as known per se, a back-up plate 3 for supporting a hydraulic locking cylinder or means 1, on one side, and a toggle mechanism 2 forming the drive, on the other side. Plate 3 is secured to a machine frame (not shown). An opposite backing element is formed by a mold supporting plate 4 which is also fixed and secured to the machine frame. Plate 4 supports a mold part 4a. A movable mold-carrying plate 5, on which the movable mold part 5a is supported and against which both the toggle mechanism 2 and auxiliary hydraulic drives 6 apply, is guided, in a manner known per se, on tie rods 7 (four in the present example) extending between and secured to the two opposite fixed plates 3 and 4. Tie rods 7 are usually made of metals as is known. An electrical heating sleeve 8 is engaged over each of tie rods 7 (only two are shown). It will be understood that heating sleeves with a liquid heat carrier or bores may also be provided. In such a case, tie rods 7 may not only be heated, but also cooled. Further, each tie rod 7 is equipped with a strain pickup 9 (only one is shown) which may be an inductive transmitter, for example. Also associated with each tie rod 7 is a temperature sensor 10.

The strain pickups or sensors 9 are connected to a force measuring device 11, while the heating sleeves are connected to a temperature controller 12.

Since any force acting on tie rods 7 results in some small elongation thereof, the detected instantaneous elongation is a measure of the magnitude of this force. This force may be read, for example, on the force measuring device 11. On the other hand, every temperature variation in the tie rod corresponds to a definite variation in length of the rod due to thermal expansion and contraction. For each machine, exact relations between the tie rod temperature and the locking force can easily be determined and put into tables, for example. This enables the operator, as indicated at H in the FIGURE, to adjust, on controller 12, the temperature change required for changing the respective measured locking force. The force may also be controlled automatically. In such a case, the actual values of force and temperature are supplied to a force controller 13 by which the required temperature variation in tie rods 7 is effected in accordance with the desired value of the locking force and through temperature controller 12.

In the foregoing, it has been assumed that the temperature, and thus the locking force, of all four tie rods 7 is controlled in the same way. It is easily possible, however, to control the force effective in each of the tie rods separately, not only by producing a completely assymmetric locking force, but also, by increasing the force through the two upper tie rods relative to the lower ones. This may make allowance for an asymmetric geometry of the mold cavities, for example. But also inaccuracy in construction (for example, unequal length of the tie rods, oblique position of one of the mold supporting plates, etc.) may thus be compensated for.

It will be understood that temperature variations in the tie rods require time, in practice, some minutes. This time, however, is satisfactory for all practical purposes. Also, experience has shown that considerable variations in force are obtainable with relatively small temperature variations. For example, in an injection molding machine for plastics having a locking force of 500 KN (with a tie rod length of 1,000 mm and tie rod diameter of 53 mm), force variations per rod of 5.45 KN for each degree centigrade of temperature variation may be obtained, which corresponds to about 4.4% of the rated force of the machine.

Known circuits and off-the shelf devices exist to make up the block diagram shown in the FIGURE which includes the temperature control apparatus 12, the strain measuring apparatus 11 and the force controller 13.

As may be learned from the foregoing, the technological and constructional measures to be taken to control the locking force thermally are very simple. The necessary heating or cooling devices, pickups, measuring and control devices, can easily be mounted on already set up machines. In addition, as compared to mechanical adjusting devices, they have the advantage of not being exposed to wear and being hardly susceptible to disturbances.

While specific embodiments of the invention have been shown and described in detail to illustrate the application of the principles of the invention, it will be understood that the invention may be embodied otherwise without departing from such principles.

What is claimed is:

1. An injection mold for conducting molding operations, with locking device comprising a fixed backing plate, a fixed mold part plate, at least one thermally expandible and contractible tie rod connected between said fixed backing plate and said fixed mold part plate, a movable mold part plate, drive and locking means connected between said fixed backing plate and said movable mold part plate for moving said movable mold part plate toward said fixed mold part plate and locking said movable mold part plate in a molding position with respect to said fixed mold part plate, and thermal force control means associated with said tie rod for continuously sensing and for regulating the temperature thereof during molding operations to selectively change the length thereof between said fixed backing plate and said fixed mold part plate and thus the force between said fixed and movable mold part plate.

2. An injection mold with locking device according to claim 1, wherein said drive and locking means comprise a lever arrangement connected between said fixed backing plate and said movable mold part plate and a cylinder and piston combination connected between said fixed backing plate and said lever arrangement for locking said movable mold part plate in the molding position with said fixed mold part plate.

3. An injection mold with locking device according to claim 1, including at least one additional tie rod, said thermal force control means associated with said one additional tie rod for selectively changing a force exerted by said one additional tie rod.

4. An injection mold with locking device according to claim 1, wherein said thermal force control means comprises a heating sleeve on said tie rod for heating said tie rod, a temperature sensor connected to said tie rod for sensing a temperature of said tie rod, and a stress sensor connected to said tie rod for sensing the force exerted on said tie rod.

5. An injection mold with locking device according to claim 4, wherein said thermal force control means further includes a force measuring apparatus connected to said stress sensor, and a temperature control apparatus connected to said heating sleeve for changing the heating of said tie rod in accordance with a force indicated by said force measuring apparatus.

6. An injection mold with locking device according to claim 5, wherein said thermal force control means further comprises a force control apparatus connected to said temperature sensor, said temperature control apparatus and said force measuring apparatus for changing the temperature of said tie rod to apply a selected force between said fixed and movable mold part plate.

7. An injection mold with locking device according to claim 6, including at least one additional tie rod having one additional heating sleeve with one additional temperature and strain sensor connected to said temperature control apparatus and said force measuring apparatus, respectively, said force control apparatus operable to control the temperature of said one additional tie rod to selectively control the force exerted by said at least one and said one additional tie rod.

* * * * *